United States Patent
Pan et al.

(10) Patent No.: US 12,442,674 B2
(45) Date of Patent: Oct. 14, 2025

(54) RAY TRANSCEIVING SYSTEM OF UNDERWATER FLOWMETER AND DEDUCTION METERING METHOD

(71) Applicants: Haimo Subsea Technology (Shanghai) co., Ltd., Shanghai (CN); HAIMO TECHNOLOGY (Group) Co., Ltd., Lanzhou (CN)

(72) Inventors: Yanzhi Pan, Shanghai (CN); Zhengang Wang, Lanzhou (CN); Pengrong Wen, Shanghai (CN)

(73) Assignees: Haimo Subsea Technology (Shanghai) co., Ltd., Shanghai (CN); HAIMO TECHNOLOGY (Group) Co., Ltd., Lanzhou (CN)

( * ) Notice: Subject to any disclaimer, the term of this patent is extended or adjusted under 35 U.S.C. 154(b) by 539 days.

(21) Appl. No.: 17/893,023

(22) Filed: Aug. 22, 2022

(65) Prior Publication Data

US 2023/0146177 A1    May 11, 2023

(30) Foreign Application Priority Data

Oct. 29, 2021    (CN) .......................... 202111267607.2

(51) Int. Cl.
*G01F 1/704* (2006.01)
*G01F 1/74* (2006.01)

(52) U.S. Cl.
CPC .............. *G01F 1/7042* (2013.01); *G01F 1/74* (2013.01)

(58) Field of Classification Search
CPC .......... G01F 1/7042; G01F 1/74; G01F 1/662; G01F 1/66; G01N 23/12
See application file for complete search history.

(56) References Cited

U.S. PATENT DOCUMENTS 9,870,609 B2 *    1/2018    Kompalli .......... G06F 18/24133
2011/0278445 A1   11/2011   Chazal et al.
(Continued)

FOREIGN PATENT DOCUMENTS

CN    106706047 A *    5/2017   .......... E21B 47/001
CN    106768120 A      5/2017
(Continued)

OTHER PUBLICATIONS

Dunn, et al., Gamma Ray Spectroscopy (Year: 2020).*
(Continued)

*Primary Examiner* — Michael J Logie
*Assistant Examiner* — Laura Eloise Tandy
(74) *Attorney, Agent, or Firm* — Bayramoglu Law Offices LLC

(57) ABSTRACT

A ray transceiving system of an underwater flowmeter includes a flowmeter body. A fluid metering channel, a transmitting window, and a probing window are arranged on the flowmeter body. The transmitting window and the probing window are respectively in communication with the fluid metering channel, and each of the transmitting window and the probing window is provided with a titanium alloy isolation seat and a beryllium pad. Titanium alloy is used to seal the fluid metering channel, the titanium alloy and the beryllium pad are combined to bear pressure, and the beryllium pad is used to reduce absorption of gamma rays. A deduction metering method of the underwater flowmeter partially deducts the gamma count rate distortion caused by the Compton scattering effect, and calculates the content of each phase in a three-phase mixed flow to improve the metering accuracy of the three-phase content of oil, gas, and water.

13 Claims, 3 Drawing Sheets

(56) References Cited

U.S. PATENT DOCUMENTS

| | | | |
|---|---|---|---|
| 2012/0087467 A1 | 4/2012 | Tjugum et al. | |
| 2013/0039461 A1* | 2/2013 | Rustad | H01P 1/08 |
| | | | 378/54 |
| 2017/0010225 A1* | 1/2017 | Rustad | H01P 1/08 |
| 2021/0325224 A1* | 10/2021 | Chen | G01F 1/74 |
| 2023/0258073 A1* | 8/2023 | Mlcak | G01V 5/08 |
| | | | 175/50 |

FOREIGN PATENT DOCUMENTS

| | | | | |
|---|---|---|---|---|
| CN | 107331429 A | | 11/2017 | |
| CN | 206618453 U | | 11/2017 | |
| CN | 107436165 A | | 12/2017 | |
| CN | 109655930 A | * | 4/2019 | ............. G01T 1/362 |

OTHER PUBLICATIONS

CN106706047A English Translation (Year: 2017).*
Michael Monteil, Juan Blanco, Raymond Veness, A transparent vacuum window for high-intensity pulsed beams, Vacuum, vol. 85, Issue 12, (Year: 2010).*
CN109655930A English Translation (Year: 2019).*
Gilmore, Practical Gamma Ray Spectrometry, 2nd Edition, Chapter 5, John Wiley & Sons (Year: 2008).*

* cited by examiner

RAY TRANSCEIVING SYSTEM OF UNDERWATER FLOWMETER AND DEDUCTION METERING METHOD

CROSS REFERENCE TO THE RELATED APPLICATIONS

This application is based upon and claims priority to Chinese Patent Application No. 202111267607.2, filed on Oct. 29, 2021, the entire contents of which are incorporated herein by reference.

TECHNICAL FIELD

The present disclosure relates to equipment and methods for offshore petroleum engineering, and in particular, to underwater multi-phase flow metering equipment for offshore petroleum engineering.

BACKGROUND

Chinese patent application (publication number: CN106706047A; CN106768120A) submitted by the applicant in 2017 discloses the use of ceramic materials (first and second ceramic sealing gaskets) to seal a fluid metering channel to reduce the absorption of gamma rays, thereby improving the measurement accuracy of the three-phase flow of oil, gas and water. However, there are problems with the production and application of flow metering equipment using ceramic materials to seal a fluid metering channel. Although the ceramic materials have little resistance to the gamma rays, they have poor ductility, are difficult to process into special-shaped structures and easy to break, and cannot meet the requirements of 20-year service life and provide product reliability.

Based on the above reasons, it is particularly urgent to find a replacement solution for ceramic materials. Conventional sealing materials include steel and polyetheretherketone (PEEK). Steel has high density and will absorb too much gamma rays, making it impossible to measure, while the PEEK does not have sufficient strength to be matched with a metal sealing ring. Titanium alloy has high strength, is relatively easy to process and form, and has a density much lower than ordinary steel, making it an alternative. However, when the thickness of the titanium alloy material is excessively large, it will still largely absorb gamma rays, which is unfavorable for improving the measurement accuracy of the three-phase flow of oil, gas and water. The heavy components inside titanium alloy scatter gamma rays largely. Compared with ordinary ceramic windows or PEEK windows, titanium alloy forms an obvious Compton effect on the ray spectrum (see Chinese patent applications with publication numbers: CN107436165A and CN107331429A). The high-energy gamma ray $\gamma_h$ is partially reduced to the energy level $\gamma_l$ after the Compton scattering of the titanium alloy, which may coincide with the low-energy ray $\gamma'_l$ emitted by the gamma source itself, resulting in the distortion of the count rate obtained by the gamma probe, which deepens as the thickness of the titanium alloy penetrated by the gamma rays increases. This requires further adjustment and optimization of the sealing structure in terms of structure and material, reducing the thickness of the titanium alloy while ensuring the compressive strength, and a solution to the influence of Compton scattering on the count rate of the probe is sought.

SUMMARY

In view of this, the present disclosure firstly provides a ray transceiving system of an underwater flowmeter, which ensures the compressive strength and reduce the absorption of gamma rays with new material/material combination and structural design.

The technical solutions are as follows:

A ray transceiving system of an underwater flowmeter includes a flowmeter body. A fluid metering channel extends through the flowmeter body. A transmitting window and a probing window positioned on both sides of the fluid metering channel are arranged on the flowmeter body. An inner end of the transmitting window and an inner end of the probing window are arranged opposite to each other and are respectively in communication with the fluid metering channel separately. A ray transmitting module is arranged in the transmitting window. A ray probing module is arranged in the probing window. The ray transmitting module transmits rays to pass through the fluid metering channel. The ray probing module probes and receives the rays passing through the fluid metering channel.

The ray transmitting module includes a radioactive source assembly, a collimator, and a first isolation seat arranged in sequence. The first isolation seat is located at the inner end of the transmitting window. The first isolation seat separates and seals the fluid metering channel and the transmitting window. An inner end face of the first isolation seat is flush with and adapted to an inner wall of the fluid metering channel.

The ray probing module includes a probe component, a pressing ring, and a second isolation seat arranged in sequence. The second isolation seat is located at the inner end of the probing window. The second isolation seat separates and seals the fluid metering channel and the probing window. An inner end face of the second isolation seat is flush with and adapted to the inner wall of the fluid metering channel.

The key lines in:

A first beryllium pad is arranged between the collimator and the first isolation seat, and the first isolation seat is made of titanium alloy.

A second beryllium pad is arranged between the pressing ring and the second isolation seat, and the second isolation seat is made of titanium alloy.

According to the above technical solution, the titanium alloy and the metal beryllium are combined, and are installed and cooperate in a new structural form. The titanium alloy which is relatively easy to process and form is used to seal the fluid metering channel, the titanium alloy and the beryllium pad are combined to bear pressure, and the beryllium pad is used to reduce absorption of gamma rays, so as to solve the problems of inconvenient processing, short service life, and low reliability caused by material (ceramic) problems.

In addition, the present disclosure continues to provide a deduction metering method of an underwater flowmeter on the basis of using the titanium alloy as a sealing material, which solves the problem of energy level coincidence caused by Compton scattering from the perspective of improving the accuracy of a gamma count rate, so as to improve the metering accuracy. The technical solutions are as follows:

A deduction metering method of an underwater flowmeter includes the following steps:

step I, arranging the above ray transceiving system of an underwater flowmeter, penetrating the fluid metering channel using any two groups of energy levels of the radioactive source assembly, and respectively obtaining gamma count rates N corresponding to a first energy level and a second energy level by the probe component;

step II, measuring a first empty tube count rate $N_0^1$ and a second empty tube count rate $N_0^2$ of the two groups of energy levels under a condition of emptying the fluid metering channel, where in a metering state, a three-phase mixed flow of oil, gas and water passes through the fluid metering channel, and a first measured count rate $N_x^1$ and a second measured count rate $N_x^2$ of the two groups of energy levels are measured respectively;

step III, delineating a first empty tube deduction value $S_0^1$ and a second empty tube deduction value $S_0^2$ on an empty tube gamma absorption spectrum; and delineating a first measured deduction value $S_x^1$ and a second measured deduction value $S_x^2$ on a measured gamma absorption spectrum; and deducting and correcting the first empty tube count rate $N_0^1$, the second empty tube count rate $N_0^2$, the first measured count rate $N_x^1$, and the second measured count rate $N_x^2$ respectively to obtain a first empty tube deduction count rate $N_{m0}^1$, a second empty tube deduction count rate $N_{m0}^2$, a first measured deduction count rate $N_{mx}^1$, and a second measured deduction count rate $N_{mx}^2$ in sequence, where $N_{m0}^1 = N_0^1 - S_0^1$;
$N_{m0}^2 = N_0^2 - S_0^2$;
$N_{mx}^1 = N_x^1 - S_x^1$; and
$N_{mx}^2 = N_x^2 - S_x^2$;

step IV, calculating a gas phase content $\alpha_{gas}$, an oil phase content $\alpha_{oil}$, and a water phase content $\alpha_{water}$ in the multi-phase mixed flow according to the following formulas:

$$\begin{cases} -\frac{1}{d}\mathrm{Ln}\frac{N_{mx}^1}{N_{m0}^1} = \alpha_{gas} \cdot \mu_{gas}^1 + \alpha_{oil} \cdot \mu_{oil}^1 + \alpha_{water} \cdot \mu_{water}^1 \\ -\frac{1}{d}\mathrm{Ln}\frac{N_{mx}^2}{N_{m0}^2} = \alpha_{gas} \cdot \mu_{gas}^2 + \alpha_{oil} \cdot \mu_{oil}^2 + \alpha_{water} \cdot \mu_{water}^2 \\ \alpha_{gas} + \alpha_{oil} + \alpha_{water} = 1 \end{cases},$$

where d is a distance that a gamma ray passes through the fluid metering channel;

$\mu_{gas}^1$ is an absorption coefficient of a gas phase relative to a gamma ray of the first energy level;

$\mu_{oil}^1$ is an absorption coefficient of an oil phase relative to the gamma ray of the first energy level;

$\mu_{water}^1$ is an absorption coefficient of a water phase relative to the gamma ray of the first energy level;

$\mu_{gas}^2$ is an absorption coefficient of the gas phase relative to a gamma ray of the second energy level;

$\mu_{oil}^2$ is an absorption coefficient of the oil phase relative to the gamma ray of the second energy level; and $\mu_{water}^2$ is an absorption coefficient of the water phase relative to the gamma ray of the second energy level.

After Compton scattering of the high-energy gamma rays, the scattering low-energy level coincides with the original low-energy level, and the count rate will be superimposed and increased on the gamma absorption spectrum. According to the above method steps, a count rate of the original low-energy level can be obtained by deducting a count rate of the detected scattering low-energy level on the gamma absorption spectrum.

DETAILED DESCRIPTION OF THE EMBODIMENTS

The following further describes the present disclosure with reference to embodiments and the accompanying drawings.

Embodiment 1

Figure 1:
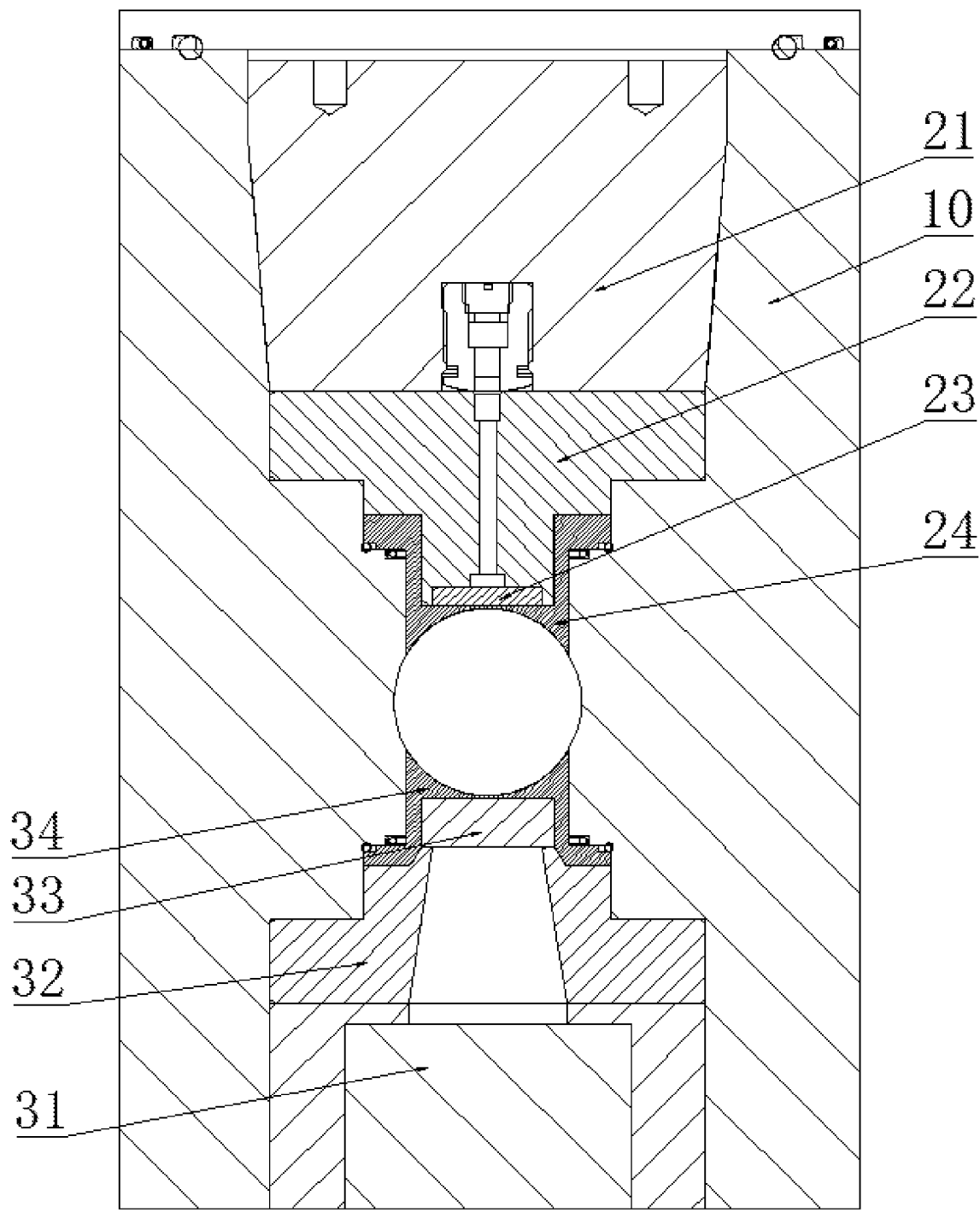
FIG. 1 is a schematic structural diagram of a ray transceiving system of an underwater flowmeter.
Figure 2:
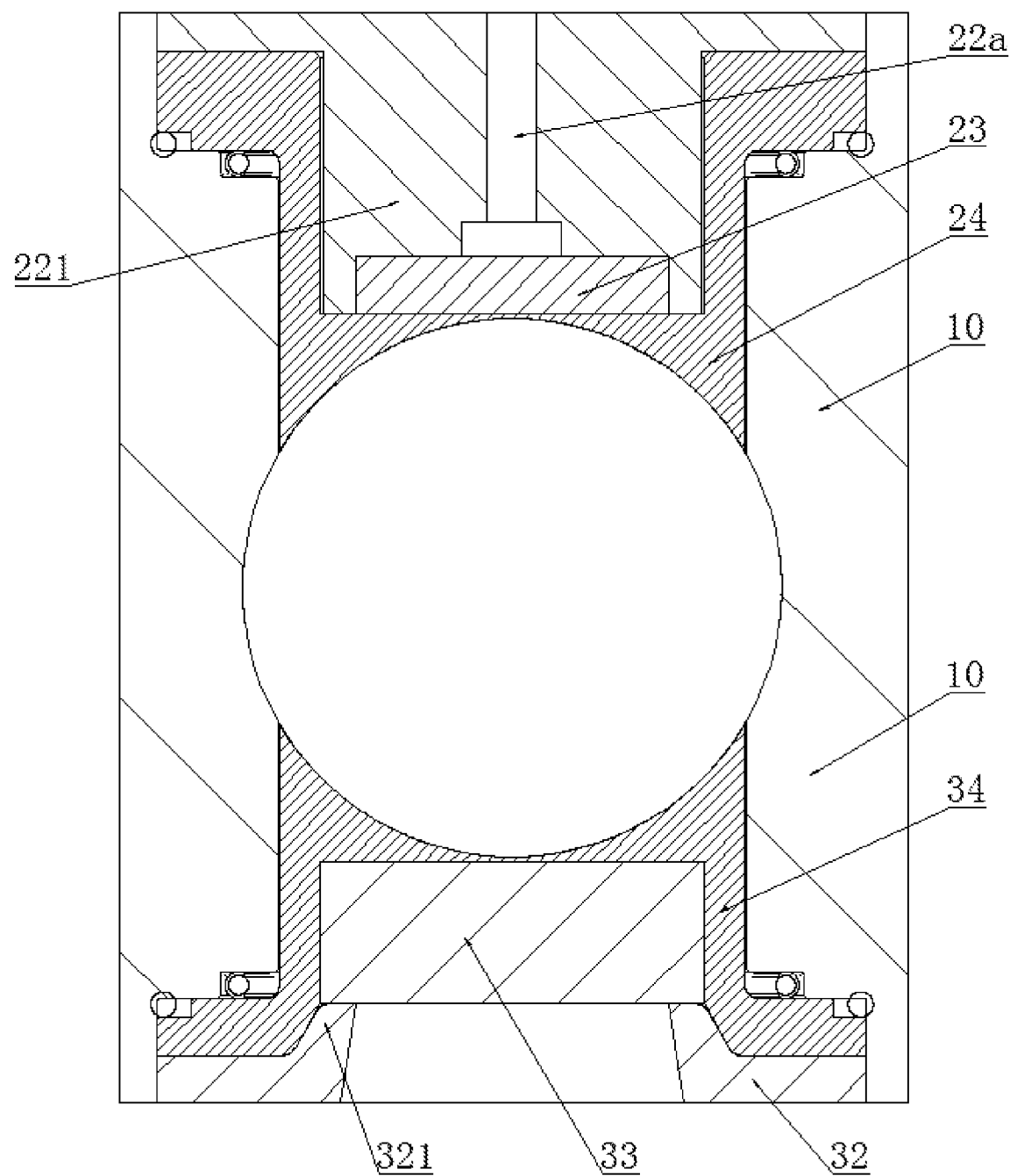
FIG. 2 is a schematic diagram of assembly relationships of a collimator 22, a first beryllium pad 23, and a first isolation seat 24, as well as a pressing ring 32, a second beryllium pad 33, and a second isolation seat 34.

As shown in FIG. 1 and FIG. 2, a ray transceiving system of an underwater flowmeter includes a flowmeter body 10. A fluid metering channel extends through the flowmeter body 10. The fluid metering channel is conventionally arranged as a circular hole type channel. A transmitting window and a probing window on positioned both sides of the fluid metering channel are arranged on the flowmeter body 10. An inner end of the transmitting window and an inner end of the probing window are arranged opposite to each other and are respectively in communication with the fluid metering channel separately. A ray transmitting module is arranged in the transmitting window. A ray probing module is arranged in the probing window. The ray transmitting module transmits rays to pass perpendicular to a hole center line of the fluid metering channel. The ray probing module probes and receives the rays passing through the fluid metering channel.

The ray transmitting module includes a radioactive source assembly 21, a collimator 22, and a first isolation seat 24 arranged in sequence. The first isolation seat 24 is located at the inner end of the transmitting window. The first isolation seat 24 separates and seals the fluid metering channel and the transmitting window. An inner end face of the first isolation seat 24 is flush with and adapted to an inner wall of the fluid metering channel.

The ray probing module includes a probe component 31, a pressing ring 32, and a second isolation seat 34 arranged in sequence. The second isolation seat 34 is located at the inner end of the probing window. The second isolation seat 34 separates and seals the fluid metering channel and the probing window. An inner end face of the second isolation seat 34 is flush with and adapted to the inner wall of the fluid metering channel.

A first beryllium pad 23 is arranged between the collimator 22 and the first isolation seat 24, and the first isolation seat 24 is made of titanium alloy.

A second beryllium pad 33 is arranged between the pressing ring 32 and the second isolation seat 34, and the second isolation seat 34 is made of titanium alloy.

A surface of the first isolation seat 24 facing the collimator 22 is provided with a first embedded counterbore. The collimator 22 is provided with a first top piece 221 matched with the first embedded counterbore. The first top piece 221 is provided with a beryllium sheet insertion opening. The beryllium sheet insertion opening faces a bottom of the first embedded counterbore. The first beryllium pad 23 is embedded in and matched with the beryllium sheet insertion opening. The first top piece 221 is embedded in the first embedded counterbore. A protruding end of the first top piece 221 abuts against the bottom of the first embedded counterbore. The first beryllium pad 23 abuts against the bottom of the first embedded counterbore. A collimating hole 22a penetrates through the collimator 22. A hole center line of the collimating hole 22a is perpendicular to and intersects with the hole center line of the fluid metering channel. The collimating hole 22a includes two sections, one of which has a smaller hole diameter than the other. The small hole end of the collimating hole 22a faces the radioactive source assembly 21. The large hole end of the collimating hole 22a is in communication with the beryllium sheet insertion opening and faces the first beryllium pad 23.

A surface of the second isolation seat 34 facing the pressing ring 32 is provided with a second embedded counterbore. The second beryllium pad 33 is embedded in and matched with the second embedded counterbore. The pressing ring 32 abuts both the second beryllium pad 33 and the second isolation seat 34. The second embedded counterbore includes a circular bore segment and a circular frustum bore segment. The circular bore segment is adjacent to the fluid metering channel. The circular frustum bore segment faces the pressing ring 32. The second beryllium pad 33 is embedded in the circular bore segment. An end face of the pressing ring 32 facing the second embedded counterbore is provided with a ring of pressing flange 321. The pressing flange 321 is arranged adjacent to an inner ring of the pressing ring 32. An inner ring of the pressing flange 321 is flush with the inner ring of the pressing ring 32. The pressing flange 321 is embedded in the circular frustum bore segment. An outer ring of the pressing flange 321 is adapted to and matched with a bore wall of the circular frustum bore segment. The pressing ring 32 and the pressing flange 321 are integrally formed. An arc-shaped transition is formed between an outer wall and two end faces of the outer ring of the pressing flange 321. An arc-shaped transition is formed between a large opening section and an end face are of the circular frustum bore segment to avoid stress concentration during pressure bearing and damage to the pressing ring 32 and the second isolation seat 34. An embedded end face of the pressing flange 321 abuts the second beryllium pad 33. The pressing ring 32 and the outer ring of the pressing flange 321 abut the second isolation seat 34. A thickness of the second beryllium pad 33 is greater than a thickness of the first beryllium pad 23.

Embodiment 2

A deduction metering method of an underwater flowmeter includes the following steps.

Step I, the ray transceiving system of an underwater flowmeter according to Embodiment 1 is arranged. The fluid metering channel is penetrated using any two groups of energy levels of the radioactive source assembly 21. Gamma count rates N corresponding to a first energy level and a second energy level are respectively obtained by the probe component 31.

The radioactive source assembly 21 can use a Ba-133 radioactive source assembly. The Ba-133 radioactive source mainly has three energy levels that can be used for flow measurement, namely 31 keV, 81 keV, and 356 keV respectively. As a specific embodiment, the multi-phase flow is measured by using two energy levels of 31 keV and 81 keV of Ba-133.

Step II, a first empty tube count rate $$N_0^1$$

and a second empty tube count rate $$N_0^2$$

of the two groups of energy levels are measured by the probe component 31 under a condition of emptying the fluid metering channel.

In a metering state, a three-phase mixed flow of oil, gas and water passes through the fluid metering channel, and a first measured count rate $$N_x^1$$

and a second measured count rate $$N_x^2$$

of the two groups of energy levels are measured by the probe component 31 respectively.

Step III, a first empty tube deduction value $$S_0^1$$

and a second empty tube deduction value $$S_0^2$$

are delineated on an empty tube gamma absorption spectrum. A first measured deduction value $$S_x^1$$

and a second measured deduction value $$S_x^2$$

are delineated on a measured gamma absorption spectrum. Specifically, the first empty tube deduction value $$S_0^1,$$

the second empty tube deduction value $$S_0^2,$$

the first measured deduction value $$S_x^1,$$

and the second measured deduction value $$S_x^2$$

are calculated by the following method.

Deduction ranges are delineated corresponding to the first energy level and the second energy level on the empty tube gamma absorption spectrum and the measured gamma absorption spectrum respectively. The deduction range includes two deduction lines perpendicular to an abscissa axis of the gamma absorption spectra. The two deduction lines are on both sides of peak values of the corresponding energy levels. Intersection points of the two deduction lines and the abscissa axis of the corresponding gamma absorption spectra are $$a_i^j$$

and $$b_i^j$$

respectively. Intersection points of the two deduction lines and spectral lines of the corresponding gamma absorption spectra are $$c_i^j$$

and $$d_i^j$$

respectively.

i=0,x.

j=1,2.

The first empty tube deduction value $$S_0^1$$

is a trapezoidal or rectangular area enclosed by four points $$a_0^1, b_0^1, c_0^1, \text{ and } d_0^1$$

delineated corresponding to the first energy level on the empty tube gamma absorption spectrum.

The second empty tube deduction value $$S_0^2$$

is a trapezoidal or rectangular area enclosed by four points $$a_0^2, b_0^2, c_0^2, \text{ and } d_0^2$$

delineated corresponding to the second energy enclosed by four points level on the empty tube gamma absorption spectrum.

The first measured deduction value $$S_x^1$$

is a trapezoidal or rectangular area enclosed by four points $$a_x^1, b_x^1, c_x^1, \text{ and } d_x^1$$

delineated corresponding to the first energy level on the measured gamma absorption spectrum.

The second measured deduction value $$S_x^2$$

is a trapezoidal or rectangular area enclosed by four points $$a_x^2, b_x^2, c_x^2, \text{ and } d_x^2$$

delineated corresponding to the second energy level on the measured gamma absorption spectrum.

The first empty tube count rate $$N_0^1,$$

the second empty tube count rate $$N_0^2,$$

the first measured count rate $$N_x^1,$$

and the second measured count rate $$N_x^2$$

are deducted and corrected respectively to obtain a first empty tube deduction count rate $$N_{m0}^1,$$

a second empty tube deduction count rate $$N_{m0}^2,$$

a first measured deduction count rate $$N_{mx}^1,$$

and a second measured deduction count rate $$N_{mx}^2$$

in sequence.

$$N_{m0}^1 = N_0^1 - S_0^1.$$
$$N_{m0}^2 = N_0^2 - S_0^2.$$
$$N_{mx}^1 = N_x^1 - S_x^1.$$
$$N_{mx}^2 = N_x^2 - S_x^2.$$

Figure 3:
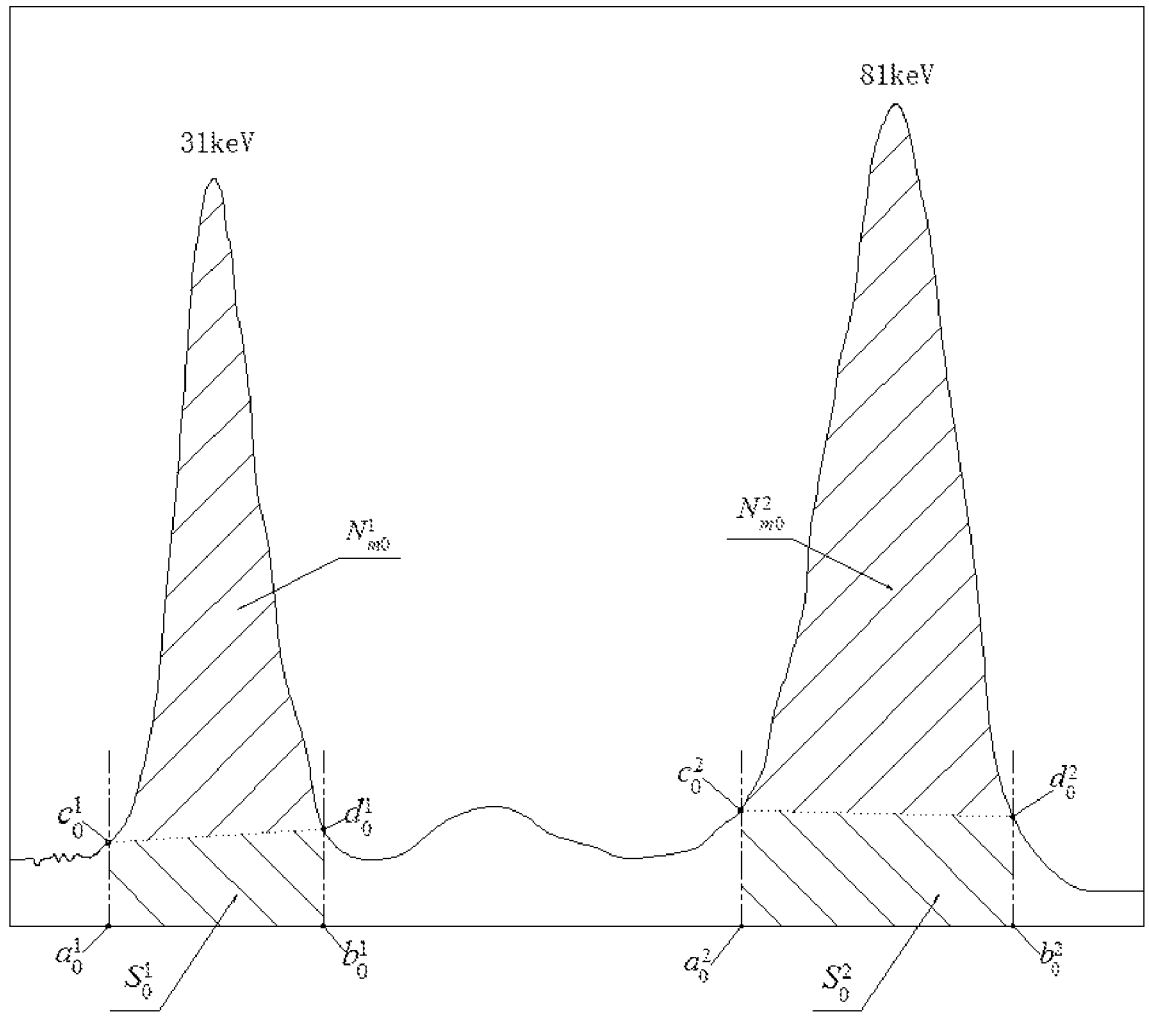
FIG. 3 is a process diagram of deducting $S_0^1$ corresponding to 31 keV and deducting $S_0^2$ corresponding to 81 keV on an empty tube gamma absorption spectrum of a Ba-133 radioactive source.

FIG. 3 shows a process diagram of deducting $$S_0^1$$

corresponding to the first energy level (31 keV) and deducting $$S_0^2$$

corresponding to the second energy level (81 keV) on the empty tube gamma absorption spectrum of the Ba-133 radioactive source. The two deduction lines are artificially set. After the deduction lines are artificially set, $$a_i^j, b_i^j, c_i^j, \text{ and } d_i^j$$

are all constants, and the setting position of the deduction line has a small influence on the metering result to a certain extent, but within an acceptable level. The first energy level (31 keV) on the empty tube gamma absorption spectrum is taken as an example.

$$N_0^1$$

measured by the probe component 31 actually includes two parts:

$$N_{m0}^1 \text{ and } S_0^1.$$

$$N_{m0}^1$$

is a gamma count rate probed by the probe component 31 of the first energy level (31 keV) gamma rays emitted by Ba-133 itself after passing through the empty tube.

$$S_0^1$$

is probed by the probe component 31 after higher energy level rays (such as part of the 81 keV energy level rays) transmitted by Ba-133, which is reduced to 31 keV after Compton scattering, pass through the empty tube, and this part is superimposed on the empty tube gamma absorption spectrum as the first energy level (31 keV) rays transmitted by Ba-133 itself, resulting in distortion of the 31 keV gamma empty tube absorption count rate probed by the probe component 31.

Similarly:

$$S_0^2$$

is deducted corresponding to the second energy level (81 keV) on the empty tube gamma absorption spectrum, $$S_x^1$$

is deducted corresponding to the first energy level (31 keV) on the measured gamma absorption spectrum, and a process of deducting $$S_x^2$$

corresponding to the second energy level (81 keV) on the measured gamma absorption spectrum is consistent with the above situation.

Step IV, a gas phase content $\alpha_{gas}$, an oil phase content $\alpha_{oil}$, and a water phase content $\alpha_{water}$ in the multi-phase mixed flow are calculated according to the following formulas:

$$\begin{cases} -\dfrac{1}{d}\mathrm{Ln}\dfrac{N_{mx}^1}{N_{m0}^1} = \alpha_{gas} \cdot \mu_{gas}^1 + \alpha_{oil} \cdot \mu_{oil}^1 + \alpha_{water} \cdot \mu_{water}^1 \\ -\dfrac{1}{d}\mathrm{Ln}\dfrac{N_{mx}^2}{N_{m0}^2} = \alpha_{gas} \cdot \mu_{gas}^2 + \alpha_{oil} \cdot \mu_{oil}^2 + \alpha_{water} \cdot \mu_{water}^2 \\ \alpha_{gas} + \alpha_{oil} + \alpha_{water} = 1 \end{cases},$$

where:

d is a distance that a gamma ray passes through the fluid metering channel, namely, a diameter of the fluid metering channel.

$\mu_{gas}^1$ is an absorption coefficient of a gas phase relative to a gamma ray of the first energy level, which is a constant.

$\mu_{oil}^1$ is an absorption coefficient of an oil phase relative to the gamma ray of the first energy level, which is a constant.

$\mu_{water}^1$ is an absorption coefficient of a water phase relative to the gamma ray of the first energy level, which is a constant.

$\mu_{gas}^2$ is an absorption coefficient of the gas phase relative to a gamma ray of the second energy level, which is a constant.

$\mu_{oil}^2$ is an absorption coefficient of the oil phase relative to the gamma ray of the second energy level, which is a constant.

$\mu_{water}^2$ is an absorption coefficient of the water phase relative to the gamma ray of the second energy level, which is a constant.

Embodiment 3

The metering method of Embodiment 2 is used to deduct and meter the test multi-phase mixed flow to obtain a deducted water content $\alpha_{water}^k$, and the traditional metering method is used to obtain a distorted water content $\alpha_{water}^l$, which is compared with a real water content $\alpha_{water}^t$ of the test multi-phase mixed flow. A deducted water content metering error $W_1$ and a distorted water content metering error $W_2$ are calculated. The only difference between the traditional metering method and Embodiment 2 is: the traditional metering method does not include step III, and the following formulas are used to calculate the distorted water content $\alpha_{water}^l$, a distorted oil content $\alpha_{oil}^l$, and a distorted gas content $\alpha_{gas}^l$:

$$\begin{cases} -\frac{1}{d}\text{Ln}\frac{N_x^1}{N_0^1} = \alpha_{gas}^l \cdot \mu_{gas}^1 + \alpha_{oil}^l \cdot \mu_{oil}^1 + \alpha_{water}^l \cdot \mu_{water}^1 \\ -\frac{1}{d}\text{Ln}\frac{N_x^2}{N_0^2} = \alpha_{gas}^l \cdot \mu_{gas}^2 + \alpha_{oil}^l \cdot \mu_{oil}^2 + \alpha_{water}^l \cdot \mu_{water}^2 \\ \alpha_{gas}^l + \alpha_{oil}^l + \alpha_{water}^l = 1 \end{cases}$$

The water content metering error $W_1$ and the distorted water content metering error $W_2$ are calculated according to the formulas:

$W1 = \alpha_{water}^k - \alpha_{water}^t$; and $W2 = \alpha_{water}^l - \alpha_{water}^t$.

Data such as the real water content of the 5 groups of test multi-phase mixed flows randomly selected for comparison in the test process is shown in Table 1:

TABLE 1

Data table of real water content of test multi-phase mixed flow

| | Liquid volume | Gas volume | $\alpha_{water}^t$ | $\alpha_{gas}^t$ | Temperature | Pressure |
|---|---|---|---|---|---|---|
| | | | Unit | | | |
| | m³/d | Sm³/d | % | % | Deg. C. | kPa |
| Group 1 | 845.74 | 0.00 | 80.10 | 0.00 | 23.71 | 128.87 |
| Group 2 | 868.12 | 0.00 | 74.79 | 0.00 | 23.80 | 127.87 |
| Group 3 | 852.34 | 522.27 | 75.00 | 31.98 | 24.11 | 133.87 |
| Group 4 | 1696.84 | 0.00 | 100.00 | 0.00 | 22.02 | 158.87 |
| Group 5 | 1152.62 | 927.69 | 29.88 | 34.00 | 22.91 | 159.87 |

The calculated deducted water content $$\alpha_{water}^k,$$

distorted water content $$\alpha_{water}^l,$$

deducted water content metering error $W_1$, and distorted water content metering error $W_2$ of the 5 groups of test multi-phase mixed flows corresponding to Table 1 are shown in Table 2:

TABLE 2

Water content and water content metering error of test multi-phase mixed flow

| | $\alpha_{water}^t$ | $\alpha_{water}^l$ | $\alpha_{water}^k$ | $W_2$ | $W_1$ |
|---|---|---|---|---|---|
| | | | Unit | | |
| | % | m³/d | Sm³/d | % | % |
| Group 1 | 80.10 | 75.20 | 79.80 | −4.90 | −0.30 |
| Group 2 | 74.79 | 69.40 | 76.20 | −5.39 | 1.41 |
| Group 3 | 75.00 | 67.40 | 73.50 | −7.60 | −1.50 |
| Group 4 | 100.00 | 96.30 | 99.80 | −3.70 | −0.20 |
| Group 5 | 29.88 | 18.40 | 31.80 | −11.48 | 1.92 |

It can be seen from Table 2 that using the deduction algorithm of Embodiment 2, the deducted water content $$\alpha_{water}^k$$

obtained by metering is relatively adjacent to the real water content $$\alpha_{water}^t,$$

and the corresponding metering error (deducted water content metering error) is less than that of the traditional algorithm without deduction (distorted water content metering error).

The beneficial effects of the present disclosure are shown in the following two aspects: on one hand, it is reflected in the structure. The titanium alloy and the metal beryllium are combined, and are installed and cooperate in a new structural form. The titanium alloy which is relatively easy to process and form is used to seal the fluid metering channel, the titanium alloy and the beryllium pad are combined to bear pressure, and the beryllium pad is used to reduce absorption of gamma rays, so as to solve the problems of inconvenient processing, short service life, and low reliability caused by material (ceramic) problems. On the other hand, it is reflected in the metering method. By deducting the count rate of the scattering low-energy levels detected on the gamma absorption spectrum, it can be metered with the result closer to the real count rate, so as to avoid the great impact of the Compton scattering effect on the results of gamma ray measurement of multi-phase flow and improve the metering accuracy.

Finally, it should be noted that the above description is only a preferred embodiment of the present disclosure. Under the enlightenment of the present disclosure, those of ordinary skill in the art can make a variety of similar representations without departing from the purpose of the present disclosure and the claims, and such transformations all fall within the protection scope of the present disclosure.

What is claimed is:

1. A ray transceiving system of an underwater flowmeter, comprising a flowmeter body, wherein a fluid metering channel extends through the flowmeter body, a transmitting window and a probing window positioned on both sides of the fluid metering channel are arranged on the flowmeter body, an inner end of the transmitting window and an inner end of the probing window are arranged opposite to each other and are respectively in communication with the fluid metering channel, a ray transmitting module is arranged in the transmitting window, a ray probing module is arranged in the probing window, the ray transmitting module transmits rays to pass through the fluid metering channel, and the ray probing module probes and receives the rays passing through the fluid metering channel;

the ray transmitting module comprises a radioactive source assembly, a collimator, and a first isolation seat arranged in sequence, wherein the first isolation seat is located at the inner end of the transmitting window, the first isolation seat separates and seals the fluid metering channel and the transmitting window, and an inner end face of the first isolation seat is flush with and adapted to an inner wall of the fluid metering channel; and the ray probing module comprises a probe component, a pressing ring, and a second isolation seat arranged in sequence, wherein the second isolation seat is located at the inner end of the probing window, the second isolation seat separates and seals the fluid metering channel and the probing window, and an inner end face of the second isolation seat is flush with and adapted to the inner wall of the fluid metering channel;

wherein a first beryllium pad is arranged between the collimator and the first isolation seat, and the first isolation seat is made of titanium alloy; and a second beryllium pad is arranged between the pressing ring and the second isolation seat, and the second isolation seat is made of titanium alloy.

2. The ray transceiving system of the underwater flowmeter according to claim 1, wherein a surface of the first isolation seat facing the collimator is provided with a first embedded counterbore, the collimator is provided with a first top piece matched with the first embedded counterbore, the first top piece is provided with a beryllium sheet insertion opening, the beryllium sheet insertion opening faces a bottom of the first embedded counterbore, the first beryllium pad is embedded in and matched with the beryllium sheet insertion opening, the first top piece is embedded in the first embedded counterbore, a protruding end of the first top piece abuts against the bottom of the first embedded counterbore, the first beryllium pad abuts against the bottom of the first embedded counterbore, a collimating hole penetrates through the collimator, the collimating hole comprises a first end with a large hole diameter and a second end with a small hole diameter, the second end of the collimating hole faces the radioactive source assembly, and the first end of the collimating hole is in communication with the beryllium sheet insertion opening and faces the first beryllium pad.

3. The ray transceiving system of the underwater flowmeter according to claim 1, wherein a surface of the second isolation seat facing the pressing ring is provided with a second embedded counterbore, the second beryllium pad is embedded in and matched with the second embedded counterbore, and the pressing ring abuts both the second beryllium pad and the second isolation seat.

4. The ray transceiving system of the underwater flowmeter according to claim 3, wherein the second embedded counterbore comprises a circular bore segment and a circular frustum bore segment, wherein the circular bore segment is adjacent to the fluid metering channel, the circular frustum bore segment faces the pressing ring, the second beryllium pad is embedded in the circular bore segment, an end face of the pressing ring facing the second embedded counterbore is provided with a ring of pressing flange, the pressing flange is arranged adjacent to an inner ring of the pressing ring, an inner ring of the pressing flange is flush with the inner ring of the pressing ring, the pressing flange is embedded in the circular frustum bore segment, an outer ring of the pressing flange is adapted to and matched with a bore wall of the circular frustum bore segment, an embedded end face of the pressing flange abuts the second beryllium pad, and the pressing ring and the outer ring of the pressing flange abut the second isolation seat.

5. The ray transceiving system of the underwater flowmeter according to claim 1, wherein a thickness of the second beryllium pad is greater than a thickness of the first beryllium pad.

6. A deduction metering method of an underwater flowmeter, comprising the following steps:
step I, arranging the ray transceiving system of the underwater flowmeter according to claim 1, penetrating the fluid metering channel using two groups of energy levels of the radioactive source assembly, and respectively obtaining gamma count rates N corresponding to a first energy level of the two groups of energy levels and a second energy level of the two groups of energy levels by the probe component;
step II, measuring a first empty tube count rate $$N_0^1$$

and a second empty tube count rate $$N_0^2$$

of the two groups of energy levels under a condition of emptying the fluid metering channel, wherein
in a metering state, a three-phase mixed flow of oil, gas and water passes through the fluid metering channel, and a first measured count rate $$N_x^1$$

and a second measured count rate $$N_x^2$$

of the two groups of energy levels are measured respectively;
step III, delineating a first empty tube deduction value $$S_0^1$$

and a second empty tube deduction value $$S_0^2$$

on an empty tube gamma absorption spectrum; and delineating a first measured deduction value $$S_x^1$$

and a second measured deduction value $$S_x^2$$

on a measured gamma absorption spectrum; and
deducting and correcting the first empty tube count rate $$N_0^1,$$

the second empty tube count rate $$N_0^2,$$

the first measured count rate $$N_x^1,$$

and the second measured count rate $$N_x^2$$

respectively to obtain a first empty tube deduction count rate $$N_{m0}^1,$$

a second empty tube deduction count rate $$N_{m0}^2,$$

a first measured deduction count rate $$N_{mx}^1,$$

and a second measured deduction count rate $$N_{mx}^2$$

in sequence, wherein $$N_{m0}^1 = N_0^1 - S_0^1;$$
$$N_{m0}^2 = N_0^2 - S_0^2;$$
$$N_{mx}^1 = N_x^1 - S_d^1; \text{ and}$$
$$N_{mx}^2 = N_x^2 - S_x^2;$$

step IV, calculating a gas phase content $\alpha_{gas}$, an oil phase content $\alpha_{oil}$, and a water phase content $\alpha_{water}$ in the three-phase mixed flow according to the following formulas:

$$\begin{cases} -\frac{1}{d}\text{Ln}\frac{N_{mx}^1}{N_{m0}^1} = \alpha_{gas} \cdot \mu_{gas}^1 + \alpha_{oil} \cdot \mu_{oil}^1 + \alpha_{water} \cdot \mu_{water}^1 \\ -\frac{1}{d}\text{Ln}\frac{N_{mx}^2}{N_{m0}^2} = \alpha_{gas} \cdot \mu_{gas}^2 + \alpha_{oil} \cdot \mu_{oil}^2 + \alpha_{water} \cdot \mu_{water}^2 \\ \alpha_{gas} + \alpha_{oil} + \alpha_{water} = 1 \end{cases}$$

wherein d is a distance that a gamma ray passes through the fluid metering channel;

$$\mu_{gas}^1$$

is an absorption coefficient of a gas phase relative to a gamma ray of the first energy level;

$$\mu_{oil}^1$$

is an absorption coefficient of an oil phase relative to the gamma ray of the first energy level;

$$\mu_{water}^1$$

is an absorption coefficient of a water phase relative to the gamma ray of the first energy level;

$$\mu_{gas}^2$$

is an absorption coefficient of the gas phase relative to a gamma ray of the second energy level;

$$\mu_{oil}^2$$

is an absorption coefficient of the oil phase relative to the gamma ray of the second energy level; and $$\mu_{water}^2$$

is an absorption coefficient of the water phase relative to the gamma ray of the second energy level.

7. The deduction metering method of the underwater flowmeter according to claim 6, wherein in step III, the first empty tube deduction value $$S_0^1,$$

the second empty tube deduction value $$S_0^2,$$

the first measured deduction value $$S_x^1,$$

and the second measured deduction value $$S_x^2$$

are calculated by the following method:
delineating deduction ranges corresponding to the first energy level and the second energy level on the empty tube gamma absorption spectrum and the measured gamma absorption spectrum respectively, wherein each of the deduction ranges comprises two deduction lines perpendicular to an abscissa axis of each of the empty tube gamma absorption spectrum and the measured gamma absorption spectrum, the two deduction lines are located on both sides of a peak value of each of the first energy level and the second energy level, intersection points of the two deduction lines and the abscissa axis of each of the empty tube gamma absorption spectrum and the measured gamma absorption spectrum are $$a_i^j \text{ and } b_i^j$$

respectively, and intersection points of the two deduction lines and a spectral line of each of the empty tube gamma absorption spectrum and the measured gamma absorption spectrum are $$c_i^j \text{ and } d_i^j$$

respectively;
i=0, x;
j=1, 2;
the first empty tube deduction value $S_0^1$ is a trapezoidal or rectangular area enclosed by four points $a_0^1, b_0^1, c_0^1,$ and $d_0^1$ delineated corresponding to the first energy level on the empty tube gamma absorption spectrum;
the second empty tube deduction value $S_0^2$ is a trapezoidal or rectangular area enclosed by four points $a_0^2, b_0^2, c_0^2,$ and $d_0^2$ delineated corresponding to the second energy level on the empty tube gamma absorption spectrum;
the first measured deduction value $S_x^1$ is a trapezoidal or rectangular area enclosed by four points $a_x^1, b_x^1, c_x^1,$ and $d_x^1$ delineated corresponding to the first energy level on the measured gamma absorption spectrum; and
the second measured deduction value $S_x^2$ is a trapezoidal or rectangular area enclosed by four points $a_x^2, b_x^2, c_x^2,$ and $d_x^2$ delineated corresponding to the second energy level on the measured gamma absorption spectrum.

8. The ray transceiving system of the underwater flowmeter according to claim 2, wherein a surface of the second isolation seat facing the pressing ring is provided with a second embedded counterbore, the second beryllium pad is embedded in and matched with the second embedded counterbore, and the pressing ring abuts both the second beryllium pad and the second isolation seat.

9. The ray transceiving system of the underwater flowmeter according to claim 2, wherein a thickness of the second beryllium pad is greater than a thickness of the first beryllium pad.

10. The deduction metering method of the underwater flowmeter according to claim 6, wherein a surface of the first isolation seat facing the collimator is provided with a first embedded counterbore, the collimator is provided with a first top piece matched with the first embedded counterbore, the first top piece is provided with a beryllium sheet insertion opening, the beryllium sheet insertion opening faces a bottom of the first embedded counterbore, the first beryllium pad is embedded in and matched with the beryllium sheet insertion opening, the first top piece is embedded in the first embedded counterbore, a protruding end of the first top piece abuts against the bottom of the first embedded counterbore, the first beryllium pad abuts against the bottom of the first embedded counterbore, a collimating hole penetrates through the collimator, the collimating hole comprises a first end with a large hole diameter and a second end with a small hole diameter, the second end of the collimating hole faces the radioactive source assembly, and the first end of the collimating hole is in communication with the beryllium sheet insertion opening and faces the first beryllium pad.

11. The deduction metering method of the underwater flowmeter according to claim 6, wherein a surface of the second isolation seat facing the pressing ring is provided with a second embedded counterbore, the second beryllium pad is embedded in and matched with the second embedded counterbore, and the pressing ring abuts both the second beryllium pad and the second isolation seat.

12. The deduction metering method of the underwater flowmeter according to claim 11, wherein the second embedded counterbore comprises a circular bore segment and a circular frustum bore segment, wherein the circular bore segment is adjacent to the fluid metering channel, the circular frustum bore segment faces the pressing ring, the second beryllium pad is embedded in the circular bore segment, an end face of the pressing ring facing the second embedded counterbore is provided with a ring of pressing flange, the pressing flange is arranged adjacent to an inner ring of the pressing ring, an inner ring of the pressing flange is flush with the inner ring of the pressing ring, the pressing flange is embedded in the circular frustum bore segment, an outer ring of the pressing flange is adapted to and matched with a bore wall of the circular frustum bore segment, an embedded end face of the pressing flange abuts the second beryllium pad, and the pressing ring and the outer ring of the pressing flange abut the second isolation seat.

13. The deduction metering method of the underwater flowmeter according to claim 6, wherein a thickness of the second beryllium pad is greater than a thickness of the first beryllium pad.

* * * * *